March 15, 1938. C. OYEN 2,111,403
SPEED INDICATOR
Filed March 12, 1937
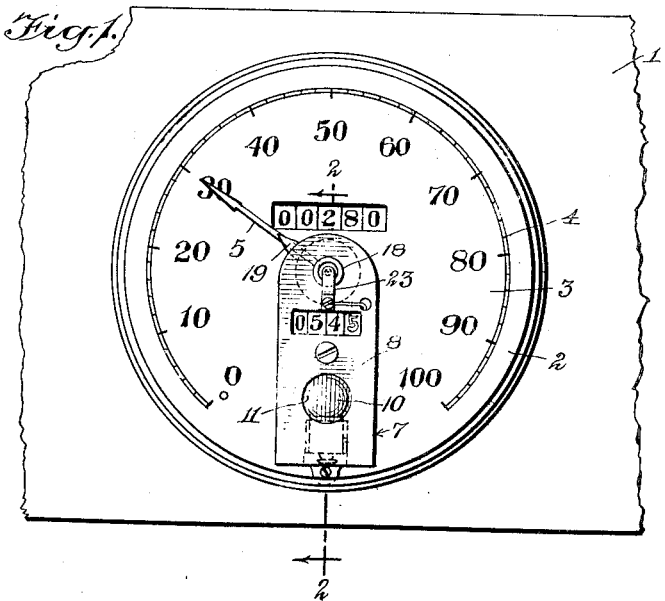
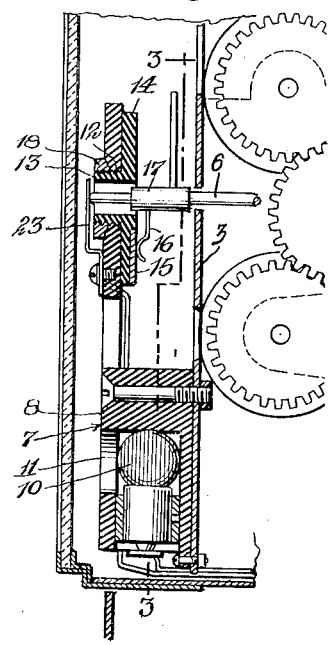
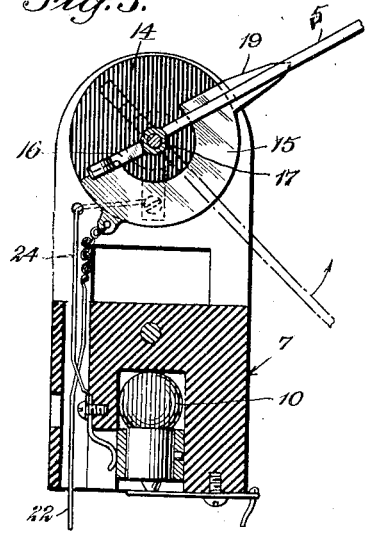
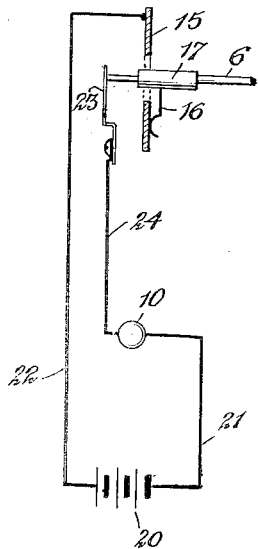
WITNESSES
INVENTOR
Chris Oyen
BY
ATTORNEYS Patented Mar. 15, 1938

2,111,403

UNITED STATES PATENT OFFICE 2,111,403

SPEED INDICATOR

Chris Oyen, Hoboken, N. J.

Application March 12, 1937, Serial No. 130,472

1 Claim. (Cl. 177—311)

This invention relates to speed indicators, and has for an object to provide an improved construction adapted to function with a speedometer for giving a signal at any set speed of an automobile without molesting the action of the indicating means of the speedometer.

Another object of the invention is to provide in connection with a speedometer of an automobile a signal lamp and means operable by the speedometer mechanism for closing the circuit of the lamp when the speedometer indicates a predetermined speed.

An additional object is to provide a device adapted to be actuated by the speedometer of an automobile, the structure being such that it may be set to function at various speeds.

In the accompanying drawing:

Fig. 1 is a front elevation of part of the instrument board of an automobile with a speedometer applied thereto;

Fig. 2 is a sectional view through Fig. 1 approximately on the line 2—2, the same being on an enlarged scale;

Fig. 3 is a sectional view through Fig. 2 approximately on the line 3—3;

Fig. 4 is a diagram of the wiring of the lamp illustrated in Fig. 2.

Referring to the accompanying drawing by numerals, 1 indicates the instrument board of an automobile and to this board is secured a speedometer 2 which may be of any desired kind having a dial 3 provided with graduations 4, and a shaft 6. A pointer 5 may be secured to the shaft 6 by any suitable means, as for instance by a sleeve 17, which in turn is held in place on the shaft 6 preferably by friction. The particular speedometer shown in the accompanying drawing is a "Delco" though the invention could be applied to other makes of speedometers without departing from the spirit of the invention. In most automobiles now in use some form of speedometer is used provided with the various members just described. This results in the speedometer indicating the speed at which the automobile is traveling, but it is necessary for the driver or other person wishing to know the speed to look more or less carefully at the face of the speedometer to learn the speed of the automobile. In the present invention means have been provided and connected with the speedometer 2 whereby a red light or other signal functions when the car reaches a certain speed. This device may be adjusted to function at various speeds, as for instance if the speed limit of a certain highway is thirty miles per hour the device would be set to function when the pointer 5 of the speedometer indicated a speed of thirty miles. The driver could increase his speed and the speedometer would continue to function to show the increased speed, but the signal device would continually indicate that the maximum permissible speed had been obtained. By using a red light which will flash on when the prescribed speed has been reached will naturally attract the eye without the necessity of the driver looking directly at the speedometer. This warns him that any additional speed might be objectionable.

The indicator device 7 is shown attached to the speedometer, but if desired it could be made as an integral part without departing from the invention. As shown in Fig. 2, the indicator 7 is bolted to the dial plate 3 in front thereof and is associated with the shaft 6 of the speedometer. While certain parts of the device are shown as made of metal and the other parts of insulating material, the parts could be rearranged and made of any desirable material provided the contacts were properly insulated. As is shown the indicator 7 is provided with a body 8 having a chamber 9 in which an electric lamp 10 is mounted. A window 11 is formed in the body 8 so that the lamp 10 may be readily seen from the front. Near the upper part of the body 1 is provided an aperture 12 through which a threaded tubular member 13 extends, said tubular member having a radiating flange 14 which is shown as a perfect disk, but if desired could be approximately half of the disk as the function of this structure is to support an arc-shaped contact plate 15. Contact plate 15 is secured to the flange 14 by adhesive, screws, or other means and coacts with the secondary contact 16 which is secured to shaft 6 through the sleeve 17, which sleeve carries the pointer 5. The threaded tubular member 13 and flange 14 are both clamped rigidly in place by a suitable nut 18.

From Fig. 3 it will be observed that the contact plate 15 is provided with a manually actuated pointer or finger 19. When it is desired to adjust pointer 19, nut 18 is loosened and then pointer 19 is moved to the desired point, as for instance to a position pointing at the numeral 30 on the dial 3. Nut 18 is then tightened and the parts will remain in this position until manually changed. However, this will not in any way affect the movement of pointer 5. When the automobile first starts the pointer 5 will leave the zero point and gradually move as the speed increases. If the speed does not reach thirty miles per hour the lamp 10 will not function, but as soon as the pointer 5 moves to indicate thirty miles per hour the auxiliary contact 16 will strike the end of the contact plate 15 and will close the circuit of lamp 10. If the pointer should move over to indicate forty, fifty or more miles per hour the auxiliary contact 16 would remain on contact plate 15 and lamp 10 would remain lit.

The diagram of the wiring is shown in Fig. 4, from which it will be seen that there is provided a suitable source of current 20 which is usually the storage battery of the automobile. A conductor 21 extends from one side of the battery 20 to one side of the lamp 10. From the opposite side of battery 20 a conductor 22 is connected with the contact plate 15 so that when the auxiliary contact 16 engages plate 15 current may pass from plate 15 to the secondary contact 6, sleeve 17, shaft 16, resilient contact 23, and conductor 24, back to the lamp 10. While a red light is preferable and therefore lamp 10 has been shown, it will be evident that a sounding device or other signaling device could be used.

I claim:

A device of the character described adapted to be mounted on an instrument dial including a hollow support having a window, an indicating lamp positioned in said hollow support so as to be visible through said window, a switch, and a switch mounting extension carried by said support for supporting said switch over the indicator hand of said dial.

CHRIS OYEN.